Figure 1:
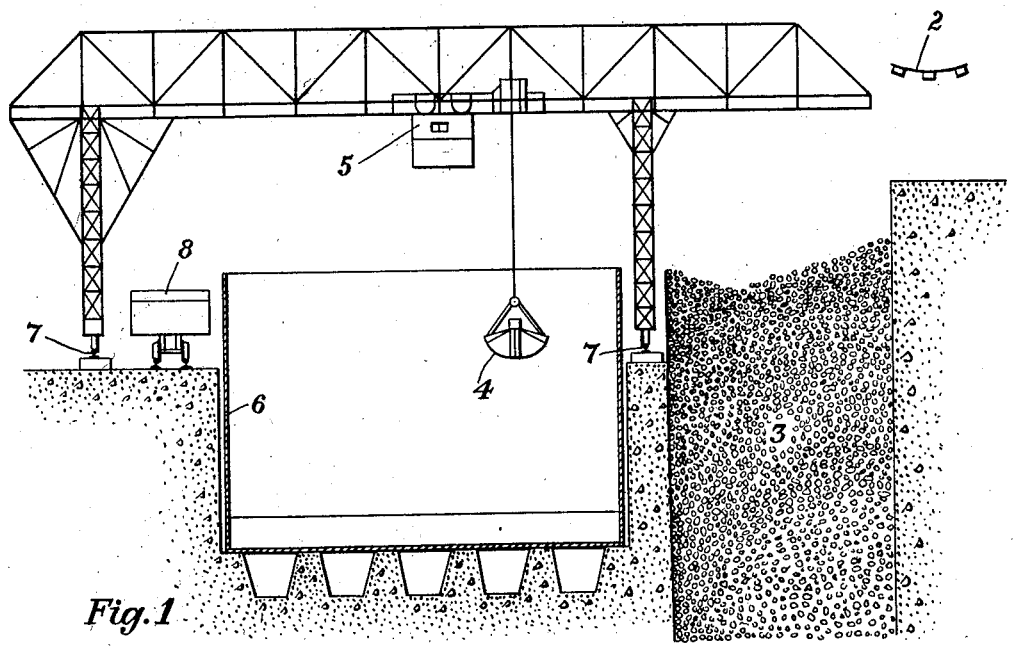

Oct. 15, 1929.    A. W. ALLEN    1,731,450

PROCESS FOR THE PRODUCTION OF CLEAR LEACH LIQUORS

Filed Nov. 24, 1925 a. w. allen
INVENTOR

Patented Oct. 15, 1929

1,731,450

UNITED STATES PATENT OFFICE

ARTHUR W. ALLEN, OF BERKELEY, CALIFORNIA

PROCESS FOR THE PRODUCTION OF CLEAR LEACH LIQUORS

Application filed November 24, 1925. Serial No. 71,236.

The purpose of the invention is to insure by simple and inexpensive means the production of a clear liquor from a contaminated solution, and to permit the efficient leaching of caliche or niter-bearing rock, and especially of a material that disintegrates readily in the leach solution.

In the development of an improved bulk-leaching process for the extraction of nitrate from caliche by means of hot solution, which is especially suitable as a solvent because of its selective preference for nitrate instead of sodium chloride at increasing temperatures, and its coagulating effect on colloidal matter, I have found that the deliberate formation and even distribution throughout the mass of small crystals of sodium chloride is an aid to the production of a clear effluent, thereby permitting the more efficient removal of the nitrate. To insure the production of these small crystals and their distribution in the manner described, I have perfected a scheme of treatment involving (1) finer crushing of the caliche, to ½ or ¼ inch, for example, and consequent restriction in amount, and the more even distribution of, the original voids between the particles; (2) the provision of an adequate false bottom, which is permeable enough to permit the free passage of the solution but none of the solid matter; (3) the heating of the solvent solution out of contact with the charge, thereby preventing the release of slime from the mass, occurring ordinarily in the operation of the Shanks process largely because of ebullition or heat currents away from the steam pipes that are placed in the lixiviation vats, the consequent movement of the liquor through comparatively few large channels, and a condition of complete or partial stagnation elsewhere; and (4) by leaching in an upward direction, thereby facilitating control of an effluent that is at some stages of lixiviation in a supersaturated condition.

By the adoption of these broad essentials of my process, the even distribution and even movement of a solvent solution, saturated in sodium chloride, through a multitude of minute channels in the mass insures the formation of small crystals of that compound, which are formed by release from the solution and deposited in amount proportionate to the quantity of nitrate of soda preferentially taken into solution because of the temperature of the liquor. The presence of these small crystals, so formed, is an advantage in providing additional insoluble during the early and subsequent leaching operations, being of a desirable size and being evenly distributed throughout the mass, so that the slime is retained with greater facility in the mass, and the effluent solution is in consequence free from suspended matter. This effluent solution, in its highest stage of concentration in terms of sodium nitrate, is available for the direct production of clean nitrate crystals of commercial grade, by cooling it; or the nitrate content of the product may be raised by re-dissolution and re-crystallization, or some of the contained water in the solution may be evaporated to insure a higher concentration of nitrate, as a preliminary to the production of a larger amount of commercial product from a unit volume of solution. During subsequent lixiviation of the mass, the weaker solution formed may be passed through other charges of material, being clear enough to be applied underneath the false bottom support, and allowed to percolate upwards. A final wash of water or sodium chloride brine is applied on top of the charge and drained in a downward direction, by gravity and/or the application of a vacuum.

In the early stages of lixiviation of a charge, the upward passage of the solution through the upper part of the charge may be accompanied also by the deposition of small crystals of nitrate of soda, because of the lowering temperature of the liquor as a result of the transfer of heat from it and from other causes. These small crystals of nitrate serve first as a filter aid and afterwards as a reserve of that material, whereby subsequent effluent solution is kept in a state of maximum concentration, or supersaturation, commensurate with the prevailing temperature and amount of nitrate remaining so available.

Moreover, whereas the adoption of the essential features of my process results in the formation of small crystals of sodium chloride that act as an efficient filter aid and facilitate the production of a clear effluent liquor, a part of such crystals may be re-dissolved before or during the final water wash, if used, having served their purpose for the clarification of the primary effluent liquors. This re-dissolution of sodium chloride I find especially practicable during washing with water in a downward direction. When the final contact between liquor and solid material is taking place in the lower part of the charge, the wash solution, being usually saturated in sodium chloride acquired in the upper part of the charge, does not re-dissolve the crystals of sodium chloride in the lower part of the charge. These, therefore, act as a filter aid during washing and drainage.

The operation of the process will be more clearly understood by reference to the accompanying drawings. It is necessary, however, to preface the description by explaining that the success of bulk leaching depends in large measure on the even composition of the charge, both in regard to nitrate content and the distribution of fine (slime) material. If there is an excess of easily soluble nitrate in one part of the vat, or if the less permeable insoluble, the slime or "borra," is not evenly distributed, channeling of the solution will occur, resulting in faulty percolation and decreased extraction. Well-known methods are available to mix the different types of caliche usually found on one property and to distribute the charge in the vat. But if blending bins are used to insure regularity of product, the expense is considerable; and the adoption of a traveling distributing belt conveyor, by which the dropping of the caliche into the vat from a height cannot be avoided, will result in an undesirable segregation of coarse from fine. This segregation may be prevented to some extent by the prior moistening of the charge, as I explained in detail in an article in "Chemical & Metallurgical Engineering," issue of June, 1925, such moistening also proving of value in securing a cheap atmospheric evaporation of water from the excess nitrate solution that may accumulate in the system and which is preferably used for this purpose instead of water.

As climatic conditions on the Chilean nitrate pampa are unusually favorable, rain being nil or negligible, it is possible to insure thorough mixing and even distribution in an extremely simple manner. An example of this is shown in Fig. 1, representing diagrammatically a cross section through one of a series of leaching vats; showing, moreover, the accessory apparatus for filling and discharging. The crushed caliche or niter-bearing rock is delivered by belt conveyor (2) alongside an excavation (3) into which it is tripped by an appropriate mechanism (not shown). This mechanism is arranged to deliver the material automatically to and fro throughout the entire length of the leaching plant and at right angles to the direction of the cross section shown, thereby insuring an adequate mixture of the various caliches crushed.

From the excavation (3) the raw material, with or without prior dampening with nitrate solution or other liquid, is picked up by a mechanical grab bucket (4), operated by means of a bridge crane (5) and distributed into the leaching vat (6), being delivered in a manner designed to insure a minimum segregation of coarse from fine. The bucket and operating mechanism is free to move throughout the entire length of the bridge structure; and this structure, moreover, may be moved on rails (7) in a direction at right angles to the direction of the cross section shown. This scope of movement in both directions permits maximum variety in the selection of raw material from the excavation (3) and the close control of its distribution in the leaching vat. At the conclusion of treatment, the residue or ripio is removed by means of the grab bucket (4) and delivered to a car (8), or to a chute or bin leading to a conveyor (not shown), for transfer to the dump or tip. The leaching vat (6) is partly sunk in the ground, to conserve heat and to permit the simplification in design of the auxiliary apparatus. It is mounted on suitable foundation pillars, between which are left passageways for the inspection of the vat bottom and to provide for piping and other necessary accessories.

Figure 2:
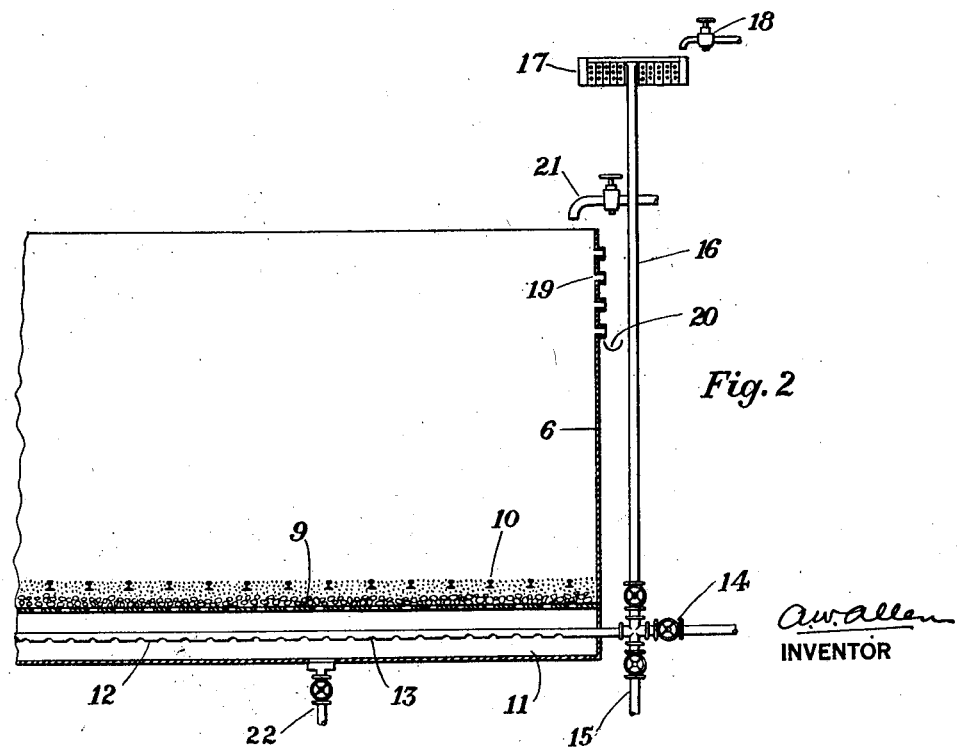

The actual operation of leaching can best be understood by reference to Fig. 2, showing diagrammatically and not to scale a portion of the leaching vat (6), with details not disclosed in Fig. 1. In addition to the inclosing sides and bottom, this vat contains an adequate though permeable false bottom (9), which may be constructed of coco matting or similar material; or it may take the form, as shown, of a sufficiency of perforated plates, on an adequate support (not shown), on which plates are placed small stone, gravel and sand, in the order named, the sand being level with the top of light iron rails (10) or other protective media embedded in it or placed upon it and provided to prevent damage to the permeable material during the discharging of the contents of the vat.

In a space (11) between the false bottom (9) and the bottom of the vat is placed a pipe or pipes (12) for the delivery of the heated solution used in the upward lixiviation of the mass. These pipes are preferably perforated on the under side (13), to permit the even distribution of the lixiviant in the space 11. The pipe 12 passes outside the vat and may be connected to a source of vapor (14) and/or water (15), suitable control valves being provided. It connects by means of a main (16) with a solution heater (17), the type used being preferably that for which I was granted Chilean Patent No. 4404. This heater is placed at a distance above the vat (6) sufficient to counteract the difference in density of the solution before and after the abstraction of the soluble material in the caliche or niter-bearing rock, and to provide against resistance to flow as a result of pipe and mass friction. The solvent for this heater enters through a pipe (18).

Near the top of the leaching vat 6 and at any convenient part of it is arranged a series of outlets (19), each of which is provided with means for opening and closing (not shown). A launder (20) may be used for the delivery of the overflowing effluent where required. The outlets 19 may be replaced by one swing decanting pipe placed inside the vat and connected only with the lowest outlet. Either system may be adopted to enable the withdrawal of the maximum amount of supernatant liquor compatible with the gradual settlement of the charge, which settlement occurs during lixiviation and is caused mainly by the abstraction of nitrate. A wash-water or wash-brine pipe (21) is also provided to deliver the final displacement liquor onto the top of the charge; and a drainage outlet (22) is provided in the bottom of the vat.

The cycle of operations is as follows, it being understood that the vat illustrated is one of a series in which a progressive concentration of weaker nitrate liquor is secured by the continuous or intermittent passage of heated lixiviant. The vat is filled or nearly filled with crushed caliche or nitre-bearing rock, by means of the system described, or by some alternative method, and the surface is leveled. With or without the prior preheating of the charge by means of vapor introduced into the distribution pipe (12), depending on the character of the raw material, the caliche is submerged in solution heated in the apparatus 17, allowed to pass down the delivery pipe 16, thence into the space 11 by means of the perforations 13 in the pipe 12. Submergence of the caliche is followed by upward lixiviation and the deposition of crystals of sodium chloride as previously described, the resulting clear effluent appearing at the top of the charge being drawn off through the top exit (19) and sent to a crystallizer or to an evaporation plant. As the resultant solution becomes too weak for crystallization or evaporation, it is bypassed, through a heater, to the charge next in series; and so on. Lixiviation of the caliche is continued so long as economically desirable, progressive weaker solutions from other charges being delivered to the heater (17) and passing thence to the space 11 and up through the charge and overflowing from one of the exits 19. At the conclusion of lixiviation the solution associated with the charge is displaced by means of a wash or washes of brine or water, applied on the top of the charge by means of the supply pipe 21, allowed to percolate downwards, to be finally drained through the gravity exit 22, a vacuum being applied if it is necessary to reduce moisture content to a minimum. In the above description, no mention has been made of auxiliary apparatus, such as pumps, for the handling and transfer of leach liquors and wash solutions. The residue or ripio is removed from the vat as previously described.

The foregoing description refers only to the use of sodium chloride as a mechanical filter aid; and for the sake of simplicity no mention has been made of the other compounds found in such liquors as those described. The invention, however, is applicable in connection with the utilization of any suitable water-soluble chemical compound that may be deposited from the leach liquor and become entrained in the mass under the specific conditions outlined. Although the process was originally developed to permit the production of clear effluent liquors from an unclassified mass and, in consequence, the efficient extraction of nitrate from the fine as well as from the coarse constituent particles, thereby avoiding the complication and expense involved in the removal and separate treatment of a proportion or of the whole of the slime or borra, it is recognized that dust losses may occur during crushing, involving a certain amount of classification, or a small proportion of the fines may be deliberately removed prior to the application of the leaching process without prejudice to the scope of the invention as claimed.

It may be necessary to emphasize the fact that the invention does not in essential detail refer to the use, as a coagulant, of the chemical that forms the filter-aid crystal, although a coagulating action may be produced thereby. The invention discloses a method to insure the formation and beneficial utilization of small crystals of a water-soluble chemical compound, to act as a mechanical filter aid in the clarification of a leach solution, whereby a material containing finely divided matter, colloidal and/or noncolloidal, may be treated efficiently by the bulk lixiviation method outlined in the aforementioned description of the essential features of my improved process.

I claim, therefore:

1. In a process as described for the production of clear leach liquor and, consequently, the more efficient extraction of nitrate from caliche or niter-bearing rock, the step of crushing the caliche to an extent insuring the provision of a multitude of channels through which a lixiviating solution is caused to pass, said lixiviant containing in solution a substance adapted to be released in the form of small crystals as the nitrate is dissolved, said crystals being deposited in said channels and in contact with the finer material in and released from the caliche by disintegration, said crystals thereafter acting as a filter aid and thereby facilitating the even passage of the solution through the mass and permitting an adequate rate of percolation.

2. In a process as described for the production of clear leach liquor and, consequently, the more efficient extraction of nitrate from caliche or niter-bearing rock, the step of heating the lixiviating solution out of contact with the charge, in order to avoid the release of slime from the mass because of ebullition or heat currents away from the steam pipes ordinarily placed in the lixiviating vat, and insuring instead the retention in situ, throughout treatment, of the slime content of the charge and of the crystals of a substance deposited from the lixiviant as nitrate is dissolved, such crystals acting as a filter aid and thereby facilitating the even passage of the solution through the mass and permitting an adequate rate of percolation.

3. In a process as described for the production of clear leach liquor and, consequently, the more efficient extraction of nitrate from caliche or niter-bearing rock, the step of passing in an upward direction through the mass a heated lixiviant containing a salt dissolved therein which will be deposited in the form of fine crystals as the nitrate dissolves, thereby aiding the retention of heat in the entering solution, insuring the maximum deposition of crystals from the solution as nitrate is dissolved, and facilitating control of an effluent in a supersaturated condition, such crystals acting as a filter aid and thereby aiding the passage of the solution through the mass and permitting an adequate rate of percolation.

4. In a process as described for the production of clear leach liquor and, consequently, the more efficient extraction of nitrate from caliche or niter-bearing rock, the step of forming and retaining in the charge small crystals of a compound originally dissolved in the lixiviant and released as and when nitrate is dissolved from the charge, such crystals acting as a filter aid and thereby facilitating the even passage of the solution through the mass and permitting an adequate rate of percolation.

5. In a process as described for the production of clear leach liquor and, consequently, the more efficient extraction of nitrate from caliche or niter-bearing rock, the use of a high-temperature lixiviating solution containing sodium chloride to insure the provision in the charge of an adequate amount of crystals of sodium chloride deposited from the lixiviant as and when nitrate is dissolved, to permit the bulk leaching of the entire mass of caliche, such crystals acting as a filter aid and thereby facilitating the passage of the solution through the mass and permitting an adequate rate of percolation.

6. A process, as described, for the production of clear leach liquor and, consequently, the more efficient extraction of nitrate from caliche or niter-bearing rock, comprising the crushing of the raw material to a size adapted to form channels sufficiently small to retain the slimes and deposited crystals, the even distribution of the crushed mixture, without removal of fines, in a leaching vat equipped with an adequate though permeable false bottom support, and its upward lixiviation by means of a solvent heated out of contact with the charge and containing a substance that is released, when nitrate is dissolved, in the form of small crystals, which are deposited in the multitude of channels in the charge insured by the method of reduction and distribution outlined, such crystals acting as a filter aid and thereby facilitating the even passage of the solution through the mass and permitting an adequate rate of percolation.

ARTHUR W. ALLEN.